(12) United States Patent
Khen et al.

(10) Patent No.: US 10,854,170 B2
(45) Date of Patent: Dec. 1, 2020

(54) INFORMATION HANDLING SYSTEM DISPLAY PARTITIONING WITH INTEGRATED MULTI-STREAM TRANSPORT

(71) Applicant: Dell Products L.P., Round Rock, TX (US)

(72) Inventors: Thien Vui Khen, Singapore (SG); Tze Fung Chung, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/361,378

(22) Filed: Mar. 22, 2019

(65) Prior Publication Data
US 2020/0302894 A1  Sep. 24, 2020

(51) Int. Cl.
*G09G 5/00* (2006.01)
*G09G 5/14* (2006.01)

(52) U.S. Cl.
CPC .............. *G09G 5/14* (2013.01); *G09G 5/006* (2013.01); *G09G 2320/0606* (2013.01); *G09G 2320/08* (2013.01); *G09G 2354/00* (2013.01); *G09G 2370/20* (2013.01); *G09G 2370/22* (2013.01)

(58) Field of Classification Search
CPC ................................. G09G 5/14; G09G 5/006
See application file for complete search history.

(56) References Cited

U.S. PATENT DOCUMENTS

| | | | |
|---|---|---|---|
| 2006/0055626 A1 | 3/2006 | Tremblay | |
| 2007/0058976 A1* | 3/2007 | Tatum | H04B 10/801 398/99 |
| 2012/0086680 A1* | 4/2012 | Ueda | G09G 5/14 345/204 |
| 2014/0130041 A1 | 5/2014 | Luxenberg et al. | |
| 2015/0220300 A1* | 8/2015 | Reynaga | G06F 3/1431 345/1.3 |
| 2016/0098963 A1* | 4/2016 | Kim | H04N 5/45 345/690 |

OTHER PUBLICATIONS

Huculak, M., "How to Use Snap Assist on Windows 10," downloaded from https://www.windowscentral.com/how-use-snap-assist-windows-10-0 on Nov. 5, 2019, 11 pages.
Support Microsoft, "Snap Your Windows," downlaoded from https://support.microsoft.com/en-us/help/4027324/windows-10-snap-your-windows on Nov. 5, 2019, 2 pages.
Dell, "What is Dell Display Manager?," downloaded from https://www.dell.com/support/article/us/en/04/qna44541/what-is-dell-display-manager?lang=en on Nov. 5, 2019, 7 pages.

* cited by examiner

*Primary Examiner* — Alexander Eisen
*Assistant Examiner* — Cory A Almeida
(74) *Attorney, Agent, or Firm* — Zagorin Cave LLP; Robert W. Holland

(57) ABSTRACT

An information handling system sends plural display image streams through a single display cable to a display for presentation as plural display images at plural partitions. A multi stream hub integrated in the display receives the display cable information and sends each display stream out a source channel of the multi stream hub to a receive channel of the display controller. The display controller blends the received display information to present display images at the display panel with the display images partitioned by receive channel.

20 Claims, 5 Drawing Sheets

INFORMATION HANDLING SYSTEM DISPLAY PARTITIONING WITH INTEGRATED MULTI-STREAM TRANSPORT

BACKGROUND OF THE INVENTION

Field of the Invention

The present invention relates in general to the field of information handling system visual image presentation, and more particularly to an information handling system display partitioning with integrated multi-stream transport.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems generally execute an operating system and applications to process information for presentation as visual images to an end user. Typically, visual images are defined by the operating system and applications executing on a central processing unit (CPU) and then further processed into pixel values by a graphics processor unit (GPU). The GPU forwards the pixel values to a timing controller of a display that scans the pixel values to pixels of the display as defined by the display's resolution. Typical display resolutions include those defined by the High Definition and Ultra High Definition standards. Further, a variety of display communication protocols are defined that transfer pixel values from a GPU to a display timing controller through a cable, such as DVI, HDMI, USB and DisplayPort protocols.

As size and resolution of flat panel displays grows, end users may feel overwhelmed by the amount of information that is presented on screen. Often end users prefer to interact with visual images presented across multiple smaller displays. Having multiple displays aids end user access to processed information by supporting simultaneous presentation of visual images by multiple applications. When a GPU has the capacity to present visual images at multiple displays, separate ports for separate cables are generally included in the information handling system housing so that each display receives visual information through its own display cable. Generally, operating systems like Windows automatically manage coordination of presentation of visual information across multiple displays, such as with an extended display presentation or a mirror display presentation. The GPU sends pixel values to each display cable port based upon the operating system configuration. In addition to presenting visual images at multiple displays, an operating system or application can divide one display panel into multiple displays that are managed separately. For instance, an Ultra High Definition display can have four high definition displays defined within it by the operating system so that four displays are effectively presented at one display device.

DisplayPort compliant GPUs and displays offer another alternative to support multiple displays known as Multi-Stream Support (MST). MST allows multiple independent displays to be driven from a single DisplayPort port of an information handling system through the use of an MST branch device. For instance, plural displays are cascaded with a daisy chain of DisplayPort cables so that pixel values for each display are forwarded from a single information handling system port through the daisy chain to each display. Alternatively, a multi-port hub, such as a four port MST hub, interfaces a single information handling system port with multiple displays to route pixel values to each display from the information handling system port.

Generally, each display includes a timing controller that presents a single video stream across a display panel. Generally, displays do not leverage MST so that operating systems and applications present multiple video streams on a single display panel. For instance, in one example use case an information handling system runs two display cables to the same display to support video tiling, also known as Picture by Picture, with each cable supporting a separate display on a defined portion of the display panel. This allows a single display panel to present itself as multiple extended screens as if the user has connected to two smaller displays for immersive productivity. A difficulty with this approach is cluttering of the desktop with cables. As another example, the operating system applies software instructions to resize and dock application windows to predefined logical partitions, such as the Microsoft Snap Assist and Dell Easy Arrange applications. Often software solutions raise security concerns for some enterprises and have inconsistent user interfaces that lead to processing inefficiencies.

SUMMARY OF THE INVENTION

Therefore, a need has arisen for a system and method which supports presentation of multiple displays at a single display panel with a single cable through a hardware multi-stream transport hub.

In accordance with the present invention, a system and method are provided which substantially reduce the disadvantages and problems associated with previous methods and systems for presenting multiple displays at a single display panel through a single cable. A peripheral display with a single display panel integrates a multi stream transport hub and a timing controller that supports multiple video channels and picture by picture video tiling so that the peripheral display presents itself to an information handling system graphics processing unit and operating system as multiple displays over a single display cable connection, thus allow the display panel to be divided into smaller display partitions for easy application docking.

More specifically, an information handling system generates visual information at a central processing unit (CPU), such as by executing an operating system or application, and provides the visual information to a graphics processor unit (GPU) for creating pixel values that define a visual image at pixels of the display, such as GPU that supports communication of display information according to the DisplayPort standard. A peripheral display interfaces with the GPU through a cable, such as DisplayPort cable, to receive the pixel values and present the visual image defined by the pixel values at a display panel having a pixel resolution. The peripheral display integrates a multi stream hub, such as a DisplayPort MST hub, that receives visual information from the information handling system cable and provides the visual information to a transmit port output for each display partition supported by the visual information. A timing controller has a receive port for each channel output by the multi stream hub with the plural channels blended to provide an output at the display panel with a resolution that shares a configured resolution for each channel. For instance, a multi stream hub presents the GPU with a link that appears to include plural displays interfaced through a single cable in a daisy chain. The multi stream hub and display controller cooperate to direct each display image provided by the information handling system to a partition of the peripheral display at a partition resolution.

The present invention provides a number of important technical advantages. One example of an important technical advantage is that docking of applications is supported by a native driver of a graphics processing unit that has a capability of outputting a multi stream video, such as is supported by the DisplayPort standard. The graphics processer unit driver detects multiple displays available through a single display cable connection and responds with multiple display outputs that the single peripheral display presents as separate display partitions. For instance, the graphics processor unit automatically detects multiple displays to output multiple video channels through the single cable for automated presentation in multiple display partitions of a single peripheral display. In this manner multiple display images at a single peripheral display are supported through a single display cable by an information handling system without any unique shortcuts or gestures through a keyboard, mouse or other input device during application docking as compared with software based display docking solutions.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A peripheral display integrates a multi stream hub to manage presentation of plural display images communicated from an information handling system at plural partitions of the display. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
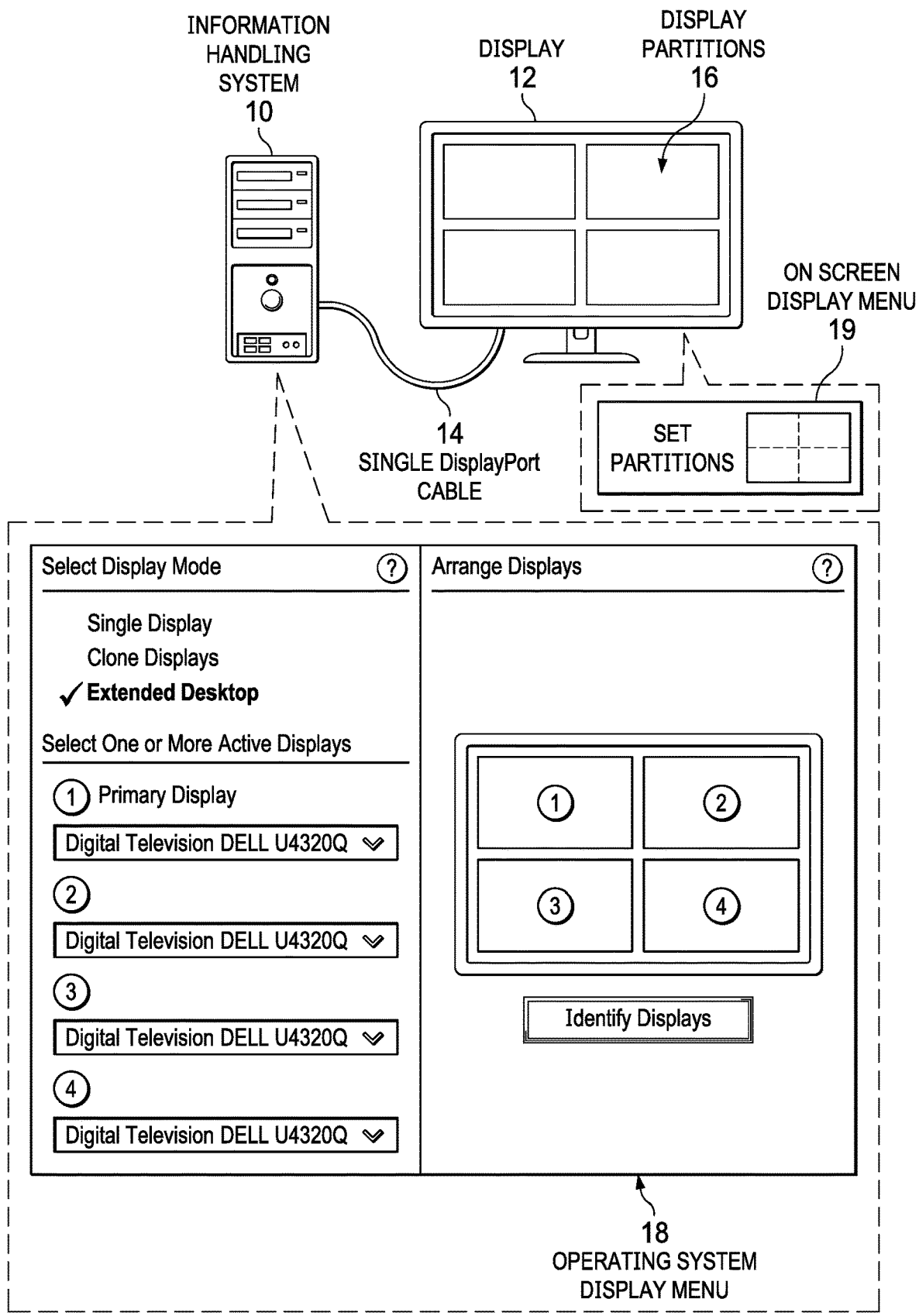
FIG. 1 depicts an information handling system interfaced with a display that presents itself as four displays to accept four display images at four display partitions.

Referring now to FIG. 1, an information handling system 10 is depicted interfaced with a display 12 that presents itself as four displays to accept four display images at four display partitions 16. In the example embodiment, information handling system 10 has a desktop configuration with visual information created at information handling system 10 presented as visual images at a separate peripheral display 12. In alternative embodiments, information handling system 10 has a portable configuration with an integrated display and, in some instances, a port that also supports presentation of visual images at a peripheral display. Information handling system 10 communicates visual information from a display port through a single display cable 14 to a display port of display 12. Visual images are sent from information handling system 10 as four display images and presented at display 12 with each display image presented in a display partition 16 of display 12. In one example embodiment, the single display cable 14 is a DisplayPort cable that accepts plural display images through a DisplayPort Multi-Stream Transport protocol, such as defined by the DisplayPort standard after version 1.2. A DisplayPort compliant multi-stream transport (MST) hub integrated in display 12 directs each display image from a source transmit channel of the hub to a sink receive channel of a timing controller of display 12 to blend the display images into a timing controller scan.

In the example embodiment, an operating system display menu 18 and/or an on screen display menu 19 provide a user interface for presentation at display 12 to accept configuration of the display partitions. On screen display menu 19 is presented by a timing controller integrated in display 12. As an alternative user interface, operating system display menu 18 is presented with an operating system driver executing on information handling system 10. Operating system display menu 18 and/or on screen display menu 19 allows an end user to select a mode having a single display image sent out cable 14 or to select presentation of an extended display with each extended display presented in a numbered display partition. Typically, a graphics processing unit (GPU) 30 or operating system (O/S) 26 is not aware of the arrangement of the display partitions 16 at display panel 40, and an end user generally has to arrange the screen layout of the operating system from a configuration agent 28 so that it matches that of display panel 40. To improve the end user experience, additional software or a driver may be used to communicate with timing controller 46 and configuration agent 28 so that the operating system screen layout is automatically adjusted to match with display panel 40 without user intervention. In an example embodiment implemented with DisplayPort standard devices, selection of presentation of plural display images at plural display partitions sets up a daisy chaining of DisplayPort sinks integrated in the timing controller through a multi-port MST hub. The operating system and graphics processor of information handling system 10 render content in each logical partition at a native resolution defined for each partition where the operating system and graphics processor see display 12 as four daisy chained extended displays having four EDIDs. In the example embodiment, one ultrahigh definition display having 4 k pixels presents four equal sized high definition displays, each having one-quarter of the 4 k pixels assigned to it.

Figure 2:
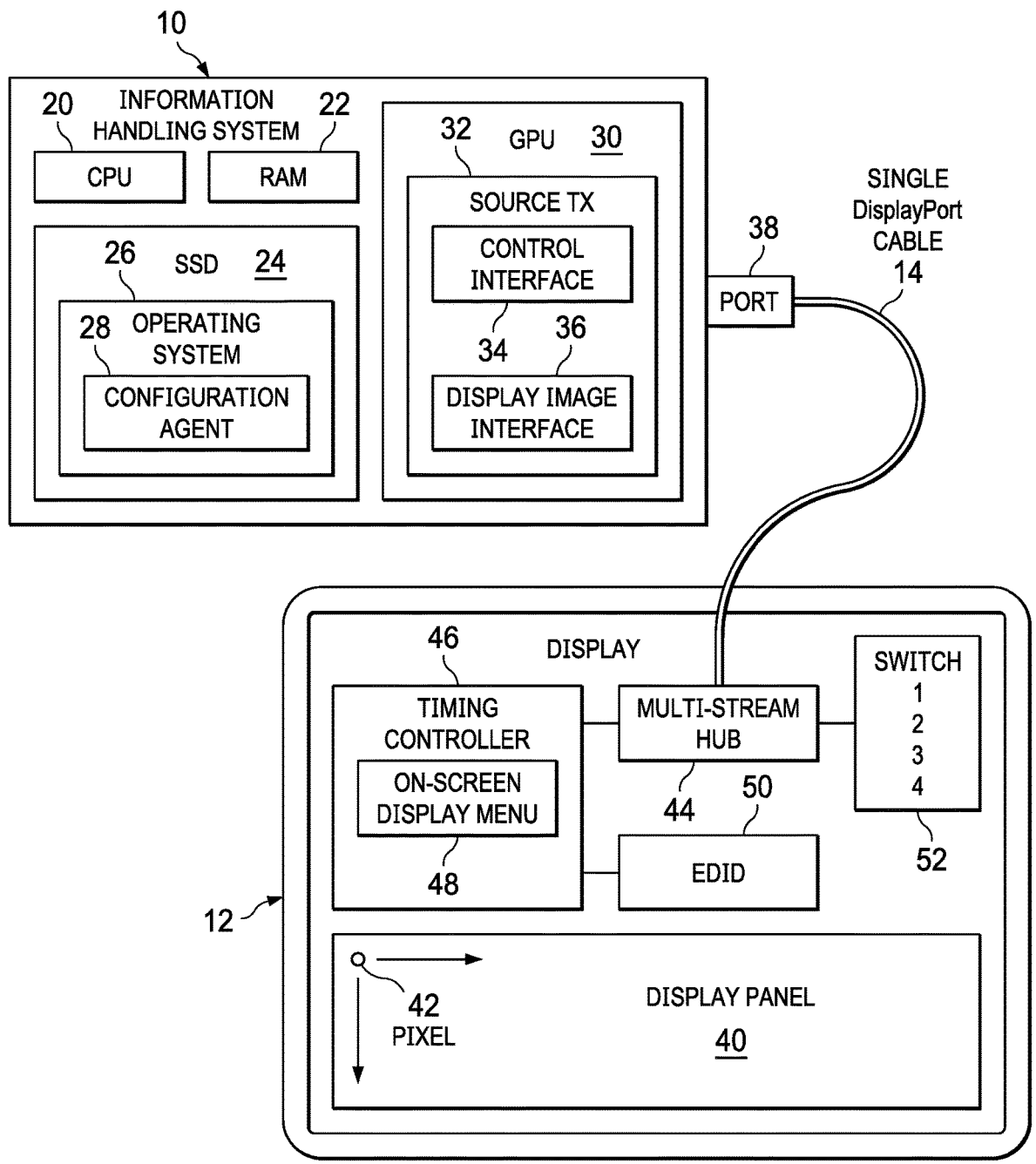
FIG. 2 depicts a block diagram of an information handling system and display configured to present plural display images at plural partitions.

Referring now to FIG. 2, a block diagram depicts an information handling system 10 and display 12 configured to present plural display images at plural partitions. In the example embodiment, a central processing unit (CPU) 20 executes instructions to process information stored in random access memory (RAM) 22. For example, a solid state drive (SSD) 24 stores an operating system 26 in persistent memory that CPU 20 retrieves to RAM 22 for execution. In the example embodiment, operating system 26 includes a configuration agent 28 that aids in configuration of a multi stream display presentation, such as through a graphics driver. A graphics processor unit (GPU) 30 interfaces with CPU 20 to accept visual information defined by operating system 26 and further process the visual information into pixel values that define a visual image on display 12. In the example embodiment, GPU 30 includes one or more DisplayPort Source transmitters 32 that sends pixel values to a port 38 for communication through display cable 14. In the example embodiment, a control interface 34 establishes a link with display 12 to establish display configuration, such as through a DisplayPort auxiliary interface. A display image interface 36 sends pixel values across unidirectional display links, such as the four lanes defined by the DisplayPort standard. In the example embodiment, port 38 communicates through a single DisplayPort cable 14 that supports multiple display images by using the DisplayPort Multi-Stream Transport protocol.

Display 12 presents visual images at a display panel 40 having plural pixels 42 disposed in an array having a defined resolution, such as a high definition resolution having 1920× 1080 array of pixels and ultrahigh definition resolution having 3840×2160 pixels. In the example embodiment depicted by FIG. 1, display panel 40 has an ultrahigh definition resolution that divides into four display partitions that each have a high definition resolution. Visual information communicated through display cable 14 to display 12 is provided to a multi stream hub 44, such as a DisplayPort MST hub, integrated in the housing of display 12. Multi stream hub 44 interfaces with a timing controller 46 that scans pixel values to pixels 42 across the array of pixels 42 so that an image is generated. Timing controller 46 stores an on-screen display menu 48 executable by timing controller 46 that presents the on-screen display menu depicted in FIG. 1 to accept display partition settings. For instance, timing controller 46 integrates flash memory or other non-transitory memory that executes instructions to present the on-screen display and manage selections through the user interface and EDID 50. In the example embodiment as depicted by FIG. 1, a separate EDID assigned to each of the four partitions and set in multi stream hub 44 provides GPU 30 with an appearance of daisy chained displays. Multi stream hub 44 receives the separate display inputs from GPU 30 through a single display cable 14 and sends each separate display input from a separate source transmit interface to separate sink receiver interfaces of timing controller 46 so that a separate display is presented in each of the partitions of display 12.

Although the example embodiment sets display presentation at display partitions with an on-screen display menu 48 executing on display timing controller 46, in alternative embodiments alternative configuration tools may be used. For example, a switch 52 may provide a physical button that allows an end user to select a number of partitions for multi stream hub 44 to present at display panel, such as by providing the selected number to a GPIO of timing controller 46. In other alternative embodiments, other logic executing on other processing elements may set the number of display partitions. In one example embodiment, the number of display cables 14 coupled to display 12 may determine if additional display partitions are depicted. For instance, if only one display cable 14 is connected to display 12, then the sending of multiple display images initiates a partition of display panel 40. If multiple display cables are coupled to display 12, then a daisy chain communication of display images is created and forwarded to the other display cables.

Figure 3:
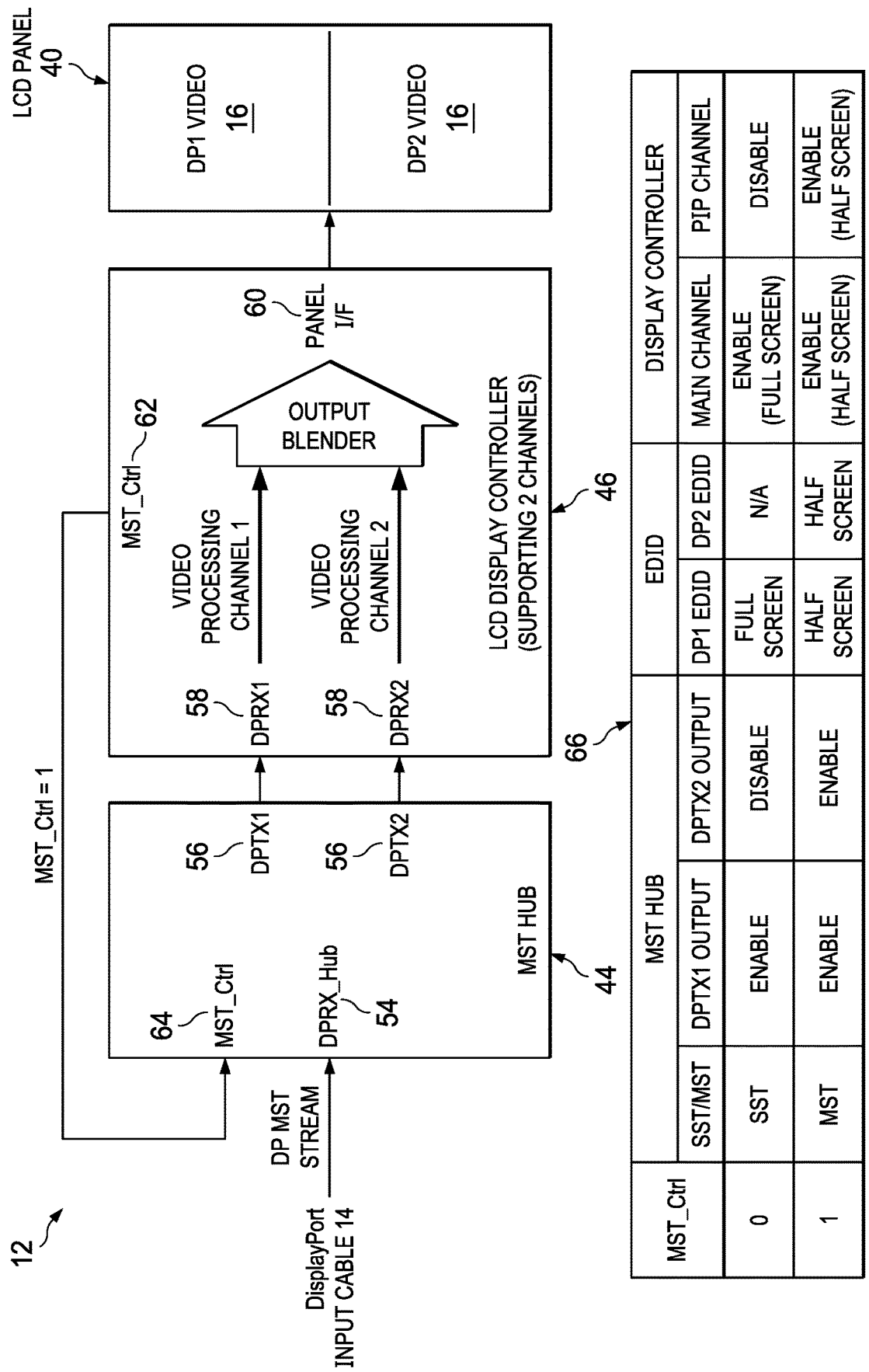
FIG. 3 depicts a circuit block diagram of a display configured to manage multi stream inputs as two equally-divided display partitions presented at a display panel.

Referring now to FIG. 3, a circuit block diagram depicts a display 12 configured to manage multi stream inputs as two equally-divided display partitions 16 presented at a display panel. Display cable 14 enters MST hub 44 through a DisplayPort sink receiver 54 DPRX_Hub to send a stream of multiple display images. MST hub 44 accepts the multiple display image streams and routes a first display image stream to a first DisplayPort transmit source 56 DPTX1 based upon a first EDID identifier and a second display image stream to a second DisplayPort transmit source 56 DPTX2 based upon a second EDID identifier. The separated display image streams proceed from the separate transmit sources 56 to separate receive sinks 58 of timing controller 46, which are labeled DPRX1 and DPRX2. Timing controller 46 receives the separate channels and blends each channel into a single display image passed through display panel interface 60 based upon the partition 16 defined for each channel. Timing controller 46 includes a control line 62 that feeds multiple bits of control signals into MST hub 44 and a control input 64 so that timing controller 46 may set MST hub 44 with control information from a control setting table 66. In the example embodiment, a control value of zero sets a full screen single stream presentation of one display image at display 12. A control value of 1 sets a multi stream presentation with two display images where each EDID identifier is assigned one-half of the display panel. In alternative embodiments, various numbers of display images may be defined with various resolutions, such as the four partitions for four display images each of high definition resolution, as depicted in FIG. 1. As another example, one display may have three partitions with one partition having half of the display panel pixels and the other two partitions sharing the remaining half of pixels. For instance, each partition may have pixel resolutions assigned by an end user and communicated to an information handling system for treatment as one display.

Figure 4:
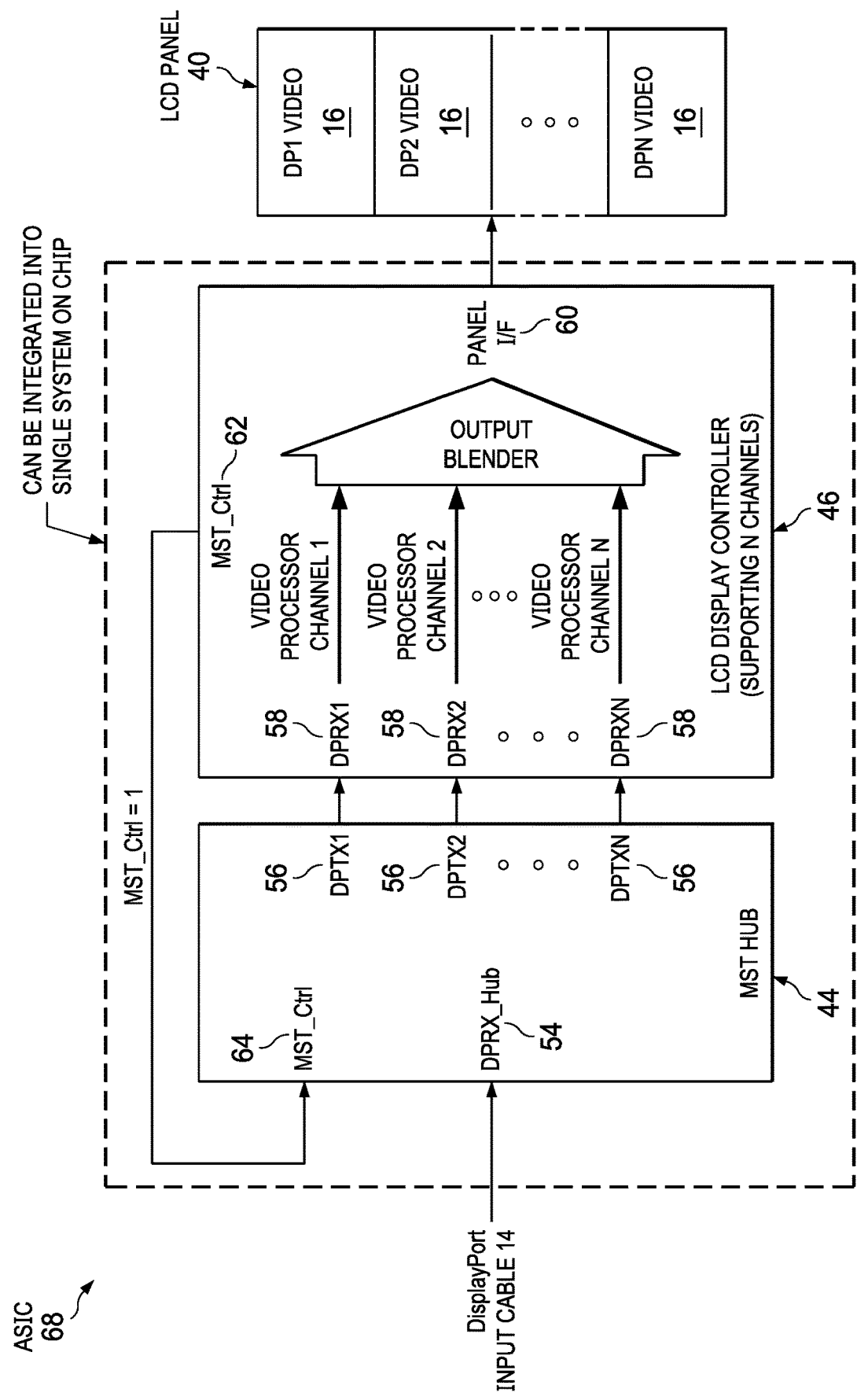
FIG. 4 depicts a circuit block diagram of the display configured to manage multi stream inputs as N multiple display partitions presented at a display panel.

Referring now to FIG. 4, a circuit block diagram depicts the display configured to select various numbers of display image inputs. In the example embodiment, MST hub 44 and timing controller 46 are integrated into an application specific integrated circuit (ASIC) 68 for more effective communication and power management. The control line 62 communicates the configuration of display images to MST hub control input 64, such as the number of display images and each display image's resolution, so that the DisplayPort link through cable 14 configures the graphics controller of an information handling system to see the configured display partition as if each is a separate display daisy chained through the single display cable 14.

Figure 5:
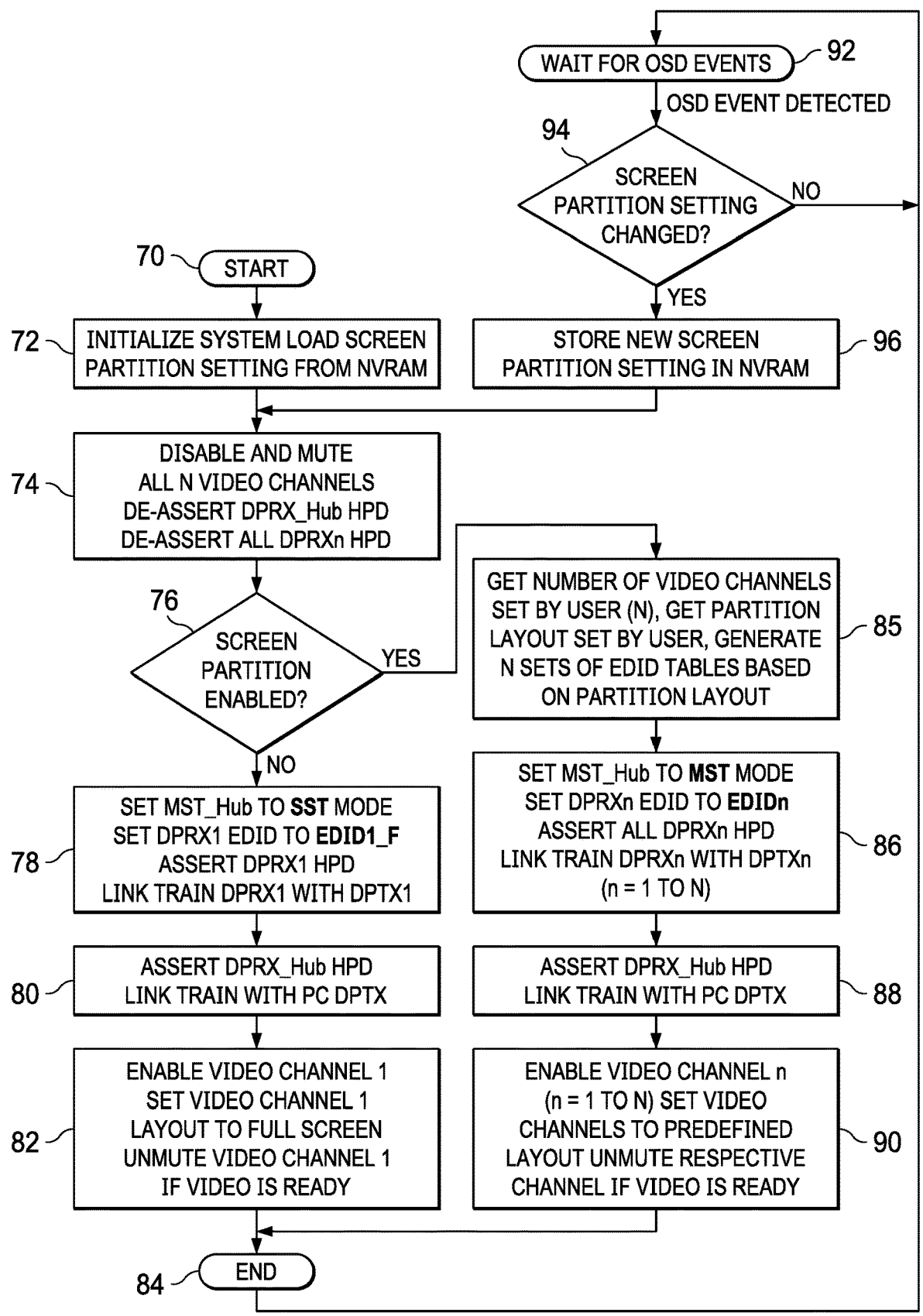
FIG. 5 depicts a flow diagram of a process for configuring a display to present various numbers of display image inputs.

Referring now to FIG. 5, a flow diagram depicts a process for configuring a display to present various numbers of display image inputs. The process starts at step 70 and continues to step 72 to initialize the display and load screen partition settings stored in local non-transient memory, such as NVRAM. The process continues to step 74 to disable and mute all N video channels of the display, to de-assert the DisplayPort receiver at the MST hub and to de-assert the DisplayPort receiver at the timing controller. At step 76 a determination is made of whether the display partition is enabled at the display. If display partition is enabled at step 76, the process continues to step 78 to establish a single stream transport (SST) of one display image to the display. At step 78, the MST hub is set to SST mode with the DisplayPort receive port EDID set to a value of EDID1_F that indicates a single stream to the full display resolution, and the DisplayPort receive port of the timing controller asserts HPD to link train with the MST hub transmit port. At step 80, the MST hub DisplayPort receive port asserts HPD to link train with the information handling system DisplayPort transmit port. At step 82 video channel 1 of the MST hub is enabled and set to a full screen unmuted presentation if channel 1 video is ready. The process then ends at step 84 with a single stream of video provided to a single partition set for the full display panel.

If at step 76 display partition is enabled, the process continues to step 85 to set up presentation of multiple display images at the display. At step 85, the number of video channels selected by the end user (N) is retrieved, the display partition layout selected by the user is retrieved and N sets of EDID entries are defined in an EDID table based upon the number of partitions. At step 86 the MST hub is set to a multi stream transport mode with each EDID of the DisplayPort receive port n set to a value of EDID(n) respectively and DisplayPort HPD asserted for receive channels of the controller from one to the N number of partitions selected so that link train is performed between the MST hub and controller receive and transmit ports of the MST hub and timing controller. At step 88 the HPD is asserted from the MST hub to link train the information handling system DisplayPort transmit for the number and resolution of the display partitions. At step 90, the video channel is enabled from one to the N number of video channels for the predefined layout with each channel unmuted if each respective channel of video is ready. The process ends at step 84.

At step 84, after completing configuration of the display, a change in configuration is supported with an on screen display menu by continuing to step 92 and waiting for an on screen display event. Upon detection of an on screen display event, the process continues to step 94 to determine if the screen partition setting has changed. If not, the process returns to step 92 to wait for a next event. If at step 94 a screen partition setting has changed, the process continues to step 96 to store the new screen partition setting in NVRAM or other non-transitory memory. At step 74, the existing settings are disabled and new settings are applied as described above.

Although the present invention has been described in detail, it should be understood that various changes, substitutions and alterations can be made hereto without departing from the spirit and scope of the invention as defined by the appended claims.

What is claimed is:

1. An information handling system comprising:
   a housing;
   a central processor unit disposed in the housing and operable to process instructions to generate visual information;
   a memory interfaced with the processor and operable to store the visual information;
   a graphics processing unit interfaced with the central processor unit and operable to process the visual information to output pixel values that define visual images at one or more displays and communicate visual images to plural separate displays through a single display cable; and
   a peripheral display having a display panel with plural pixels that present a visual image from the pixel values, the peripheral display having a display cable port interfaced with a multi-stream hub, the multi-stream hub interfaced with a display controller and integrated in the peripheral display, the display controller interfaced with the display panel, the multi-stream hub communicating pixel values as plural source channels to plural receiver channels of the display controller, each source channel having visual images of one of the plural separate displays, each receiver channel presenting one of the plural separate displays in an associated defined portion of the display panel.

2. The information handling system of claim 1 wherein the display controller:
   receives each source channel as a separate display input; and
   presents each separate display input in the associated defined portion of the display panel.

3. The information handling system of claim 2 wherein the display controller blends the separate display inputs to scan the defined portions as a blended image to the display panel.

4. The information handling system of claim 1 further comprising a manual switch disposed at the display and accepting an end user input that defines a number of display inputs configured by the multi-stream hub.

5. The information handling system of claim 1 further comprising a configuration agent executing on the central processor unit and interfaced with the multi-stream hub to define a number of display inputs configured by the multi-stream hub and communicated to the peripheral display.

6. The information handling system of claim 1 wherein the multi stream interfaces through a control input to the display controller, the multi-stream hub operable to activate a number of display inputs at the display controller based upon a number of display inputs sensed as inputs to the multi-stream hub.

7. The information handling system of claim 1 wherein the multi-stream hub includes a configuration selectable to communicate a single source channel to a single receiver channel of the display controller.

8. The information handling system of claim 1 wherein the display controller and multi-stream hub comprise a single application specific integrated circuit.

9. The information handling system of claim 1 further comprising an on screen display menu presented by the display controller and accepting an end user input to define a number of active source channels set in the multi-stream hub and communicated to the graphics processing unit.

10. A method for presenting visual images from an information handling system at a display, the method comprising:
- defining plural source channels at a multi-stream hub integrated in the display;
- linking a graphics processing unit of the information handling system to the multi-stream hub through a single display cable, the graphics processing unit communicating display visual images for plural separate displays through the single cable;
- communicating from the graphics processing unit through the single cable to the multi-stream hub the plural display visual images for each of the plural displays through each of the plural source channels;
- communicating each display image to a receiver channel of a display controller interfaced with the multi-stream hub; and
- blending the display images at the display controller to a single output presented at a display panel of the display.

11. The method of claim 10 the linking further comprises:
- sending an EDID identifier from the multi-stream hub to the graphics processing unit for each of the plural source channels; and
- establishing a display image output from the graphics processing unit to the multi steam hub for each EDID identifier.

12. The method of claim 10 wherein defining plural source channels further comprises:
- selecting a number of source channels with a hardware switch integrated in the display; and
- applying the number of source channels at the multi-stream hub.

13. The method of claim 10 wherein defining plural source channels further comprises:
- presenting an on screen display menu at the display generated locally with the display controller;
- accepting an end user selection of a number of source channels at the on screen display menu; and
- applying the number of source channels at the multi-stream hub.

14. The method of claim 10 wherein defining plural source channels further comprises:
- presenting a display configuration user interface at the display generated by an operating system of the information handling system;
- accepting an end user selection of a number of source channels at the display configuration user interface;
- sending the number of source channels from the information handling system to the display; and
- applying the number of source channels at the multi-stream hub.

15. The method of claim 10 wherein the defining plural source channels further comprises:
- communicating plural display images from the information handling system through the single cable to the multi-stream hub;
- determining the number of the plural display images at the multi stream display; and
- communicating the number from the multi-stream hub to the display controller.

16. The method of claim 10 further comprising:
- defining a single source channel at the multi-stream hub; and
- in response to the defining the single source channel, all display information through the single source channel to a single receiver channel of the display controller.

17. A display comprising:
- a display panel having plural pixels that present a visual image;
- a controller interfaced with the plural pixels to scan pixel values that define the visual image to the pixels;
- a multi-stream hub integrated in the display and having plural source channels interfaced with plural receive channels of the controller, each source channel associated with one of plural displays communicated by a graphics controller, each of the displays having a display visual image; and
- a display cable port interfaced with the multi-stream hub, the multi-stream hub receiving plural display image streams from the display cable port, each of the plural display image streams associated with one of the plural display visual images, and providing each display image stream from one of the source channels to one of the receive channels, the controller blending the display image streams for presentation of the plural display visual images at each of plural partitions defined at the display panel.

18. The display of claim 17 further comprising an on screen display menu stored in non-transitory memory and executable on the controller to select a number of source channels applied at the multi-stream hub.

19. The display of claim 18 further comprising plural EDID identifiers stored with the on screen display menu, each EDID identifier associated with one of the plural partitions of the display panel.

20. The display of claim 19 wherein the multi-stream hub has four source channels that interface with four receive channels to partition an ultra high definition display into four high definition display portions.

* * * * *